United States Patent
Newton et al.

(10) Patent No.: US 6,402,245 B1
(45) Date of Patent: Jun. 11, 2002

(54) VEHICLE SEAT WITH PNEUMATIC ADJUSTMENT

(75) Inventors: Gerrit Newton, Owen; Achim Frey, Bad Überkingen, both of (DE)

(73) Assignee: Recaro GmbH & Co., Kirchheim/Teck (DE)

(*) Notice: Subject to any disclaimer, the term of this patent is extended or adjusted under 35 U.S.C. 154(b) by 0 days.

(21) Appl. No.: 09/564,259

(22) Filed: May 4, 2000

(30) Foreign Application Priority Data

May 5, 1999 (DE) .......................... 199 20 536

(51) Int. Cl.$^7$ .............................. A47C 3/025
(52) U.S. Cl. .............. 297/284.11; 297/337; 297/DIG. 8
(58) Field of Search .................. 297/284.11, DIG. 3, 297/DIG. 8, 452.41, 311, 312, 313, 328, 337, 338, 339

(56) References Cited

U.S. PATENT DOCUMENTS

| 4,589,695 A | * | 5/1986 | Isono ................ 297/284.11 X |
|---|---|---|---|
| 4,629,248 A | | 12/1986 | Mawbey |
| 4,739,959 A | * | 4/1988 | Meiller .................... 297/328 X |
| 5,572,933 A | * | 11/1996 | Thompson ............... 297/328 X |
| 5,607,204 A | * | 3/1997 | Gryp ...................... 297/284.11 |
| 6,036,266 A | * | 3/2000 | Massara ..................... 297/328 |

FOREIGN PATENT DOCUMENTS

| DE | 198 11 958 A1 | 9/1999 | |
|---|---|---|---|
| EP | 0 204 443 A2 | 12/1986 | |
| GB | 2040674 | * 9/1980 | ............ 297/284.11 |

* cited by examiner

Primary Examiner—Peter M. Cuomo
Assistant Examiner—Stephen Vu
(74) Attorney, Agent, or Firm—Alston & Bird LLP

(57) ABSTRACT

An adjustable vehicle seat comprises a structurally fixed part, at least one adjustable part mounted for moving relative to the structurally fixed part, and an inflatable cushion positioned between the adjustable part and the structurally fixed part. The inflatable cushion is operative for pneumatically adjusting the position of the adjustable part relative to the structurally fixed part. The pneumatic adjustment of parts of the vehicle seat has the advantage that the compressed air supply which is already available can be shared, making additional electric motors for adjustment purposes unnecessary.

11 Claims, 8 Drawing Sheets

VEHICLE SEAT WITH PNEUMATIC ADJUSTMENT

BACKGROUND OF THE INVENTION

The present invention relates to a vehicle seat, in particular for a truck, having at least one structurally fixed part and at least one adjustable part which is movable relative to the structurally fixed part.

A known vehicle seat of this type has a seat frame which can be adjusted vertically by means of a scissors-type substructure and an electric motor mounted thereon.

It is an object of the present invention to provide an improved vehicle seat of the type mentioned at the beginning.

SUMMARY OF THE INVENTION

In accordance with one aspect of the present invention, an adjustable vehicle seat comprises a structurally fixed part, at least one adjustable part mounted for moving relative to the structurally fixed part, and an inflatable cushion positioned between the adjustable part and the structurally fixed part. The inflatable cushion is operative for pneumatically adjusting the position of the adjustable part relative to the structurally fixed part.

In the case of trucks, including coaches, the pneumatic adjustment of parts of the vehicle seat has the advantage that the compressed air supply which is already available can be shared, making additional electric motors for adjustment purposes unnecessary. This simplifies and reduces the cost of the production of the vehicle seat. The inflatable cushion between the adjustable part and the structurally fixed part means that the pneumatic adjustment can take place with few components and in a simple manner. A vehicle seat of this type can be produced with little outlay on material and in terms of time and is thereby cost effective.

In one preferred embodiment, adjustable side pieces are provided which are coupled to a backrest frame of the vehicle seat and can be adjusted in their pivoting angle with respect to the backrest frame. In order to arrange the inflatable cushion in such a manner that it does not interfere with the seat user, the side pieces preferably have angular elements which are, for example, formed integrally with the side pieces or are welded onto the latter, and which reach as far as the rear side of the structurally fixed part. In accordance with one aspect of this embodiment, the structurally fixed part is a lordosis support that is connected to the backrest frame. At least one tension spring is preferably provided between the angular elements on the rear side of the structurally fixed part, which tension spring attempts to position the angular elements against the rear side of the structurally fixed part. A respective inflatable cushion is preferably provided between each angular element and the rear side of the structurally fixed part, which cushion attempts to push the relevant angular element away from the rear side of the structurally fixed part counter to the force of the tension spring. Two cushions have the advantage over one cushion in that no unintentional changing of the adjustment takes place due to a side piece being stressed on one side when cornering. In the case of a single cushion, the cushion would assume an asymmetrical form due to the air flowing from one half into the other. In order to protect the cushions, and as the stop for the angular elements, a covering is preferably provided on that side of the angular elements which faces away rearward from the rear side of the structurally fixed part.

In another preferred embodiment, the vehicle seat has a structurally fixed seat-shell rear part and a seat-shell front part which can be adjusted pneumatically in its inclination. A seat cushion which is fastened or rests on the seat-shell front part and on the seat-shell rear part defines the seat surface. For a thigh support, it is sufficient if only the seat-shell front part is adjustable. Greater seat comfort can be achieved by adjusting the seat-surface length. More specifically, the seat-shell front part can be displaced relative to the seat-shell rear part, for example by the seat-shell front part being guided on a carrier plate coupled to a structurally fixed seat frame. As a result, and for example, a multi-adjustable vehicle seat is provided with few components. For reliable guiding during the seat-surface length adjustment, slideways are provided on the seat-shell front part and/or on the carrier plate. The seat-shell front part is preferably locked by means of a locking bar which is mounted movably on the carrier plate, is movable relative to the seat-shell front part and, for locking purposes, interacts with a toothed segment of the seat-shell front part. This makes reliable locking and easy unlocking possible. For better performance during a crash, it is advantageous if the locking bar is movable transversely to the seat longitudinal direction. In order to enable adjustment in a gap-free manner in the various seat-surface lengths, the seat cushion reaches, for example, a small distance below the backrest.

BRIEF DESCRIPTION OF THE DRAWINGS

In the following, the invention is explained in more detail with reference to an exemplary embodiment illustrated in the drawings, in which.

DETAILED DESCRIPTION OF THE INVENTION

Figure 1:
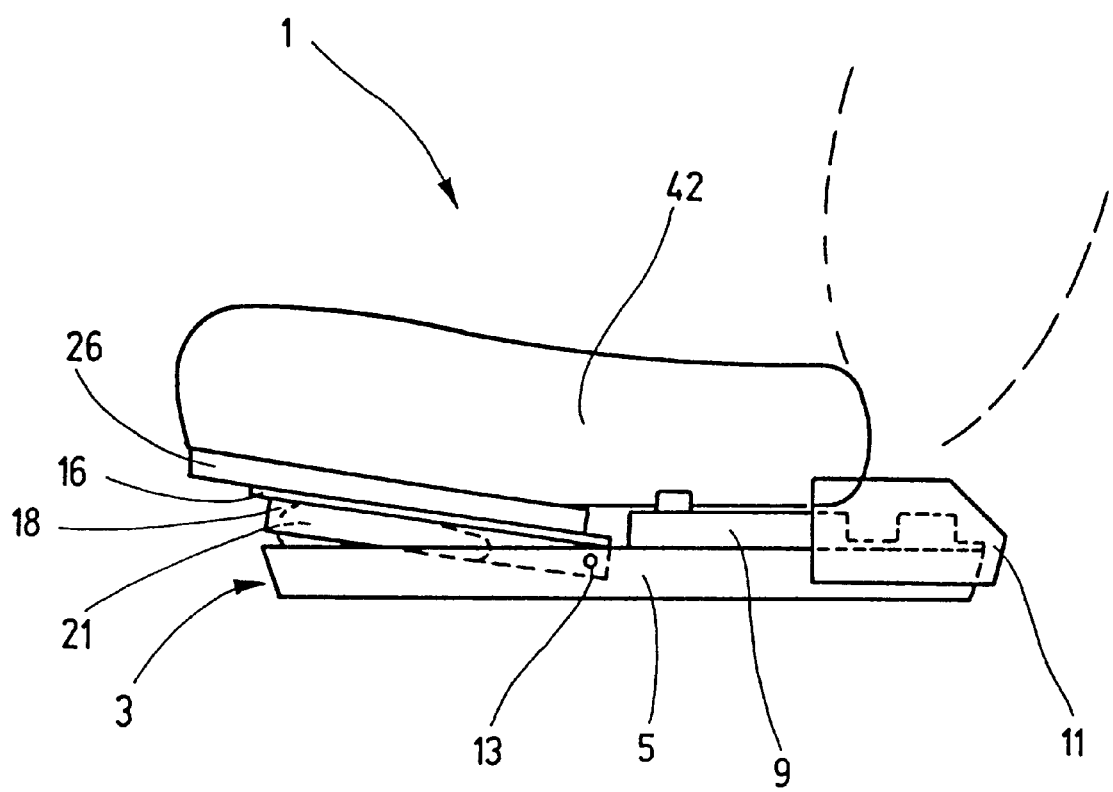
FIG. 1 shows a schematic side view of a vehicle seat according to one exemplary embodiment of the invention.
Figure 2:
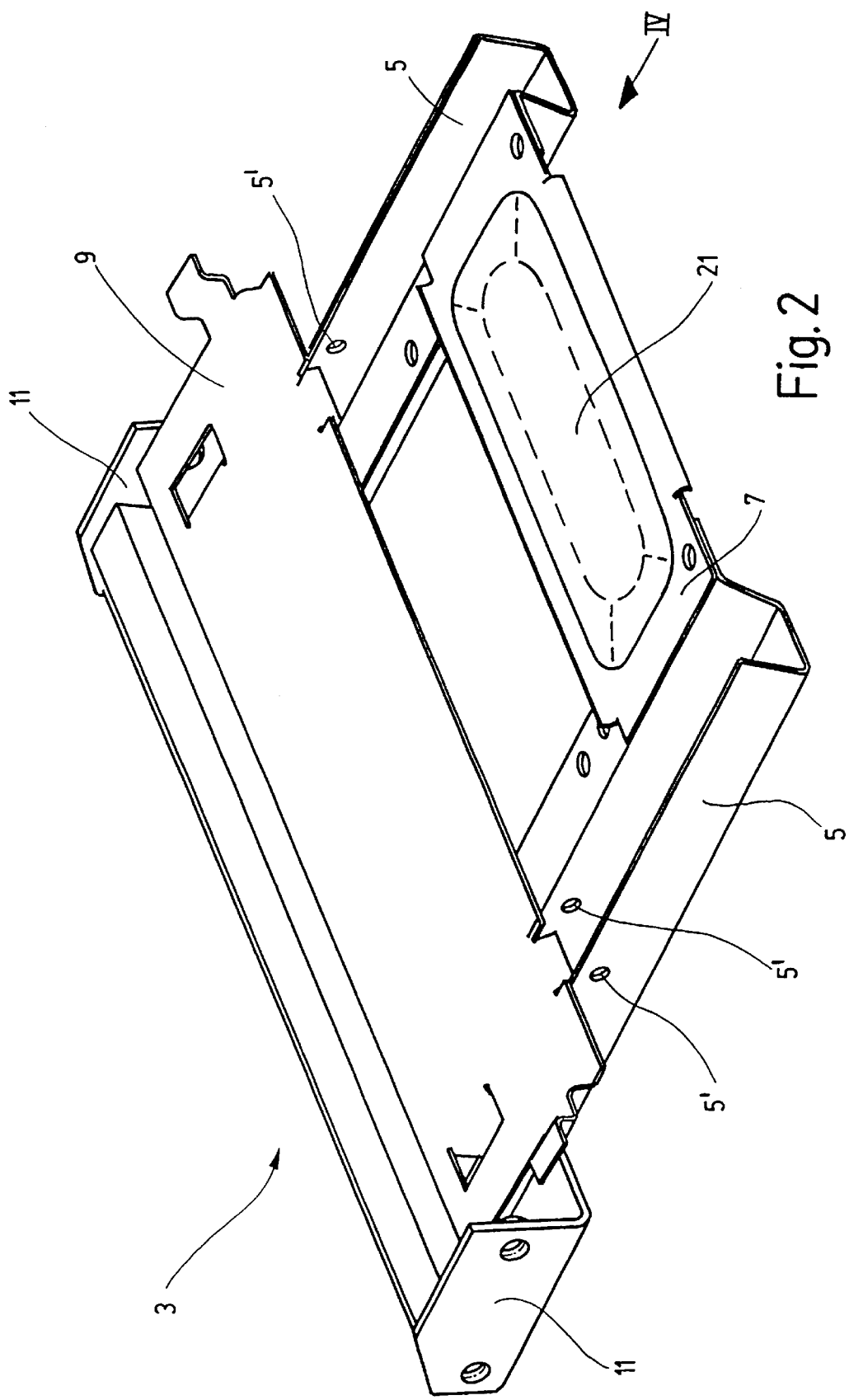
FIG. 2 shows a perspective view of a seat frame.
Figure 3:
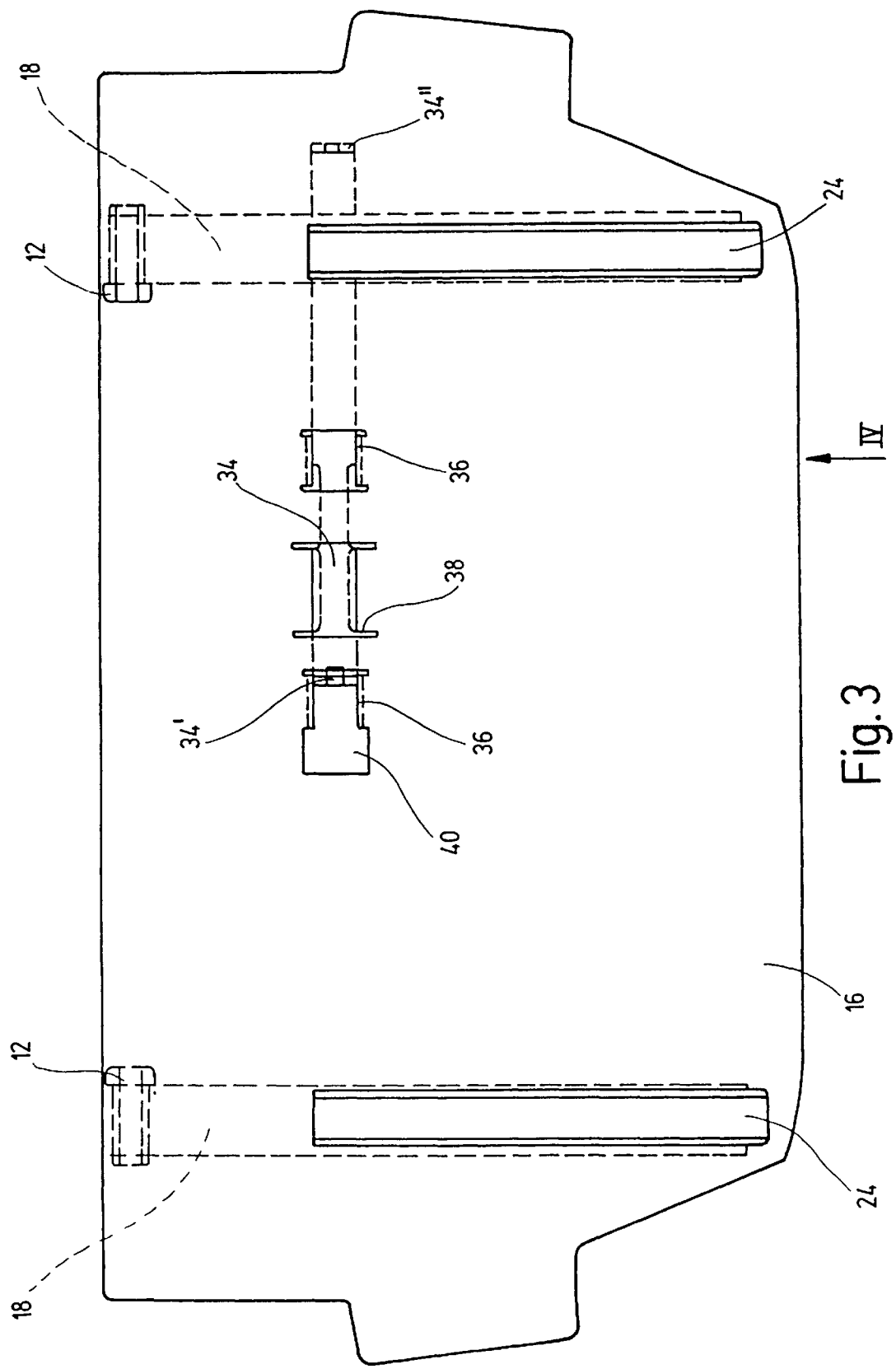
FIG. 3 shows a plan view of a carrier plate in the direction of the arrow III in FIG. 4.
Figure 4:
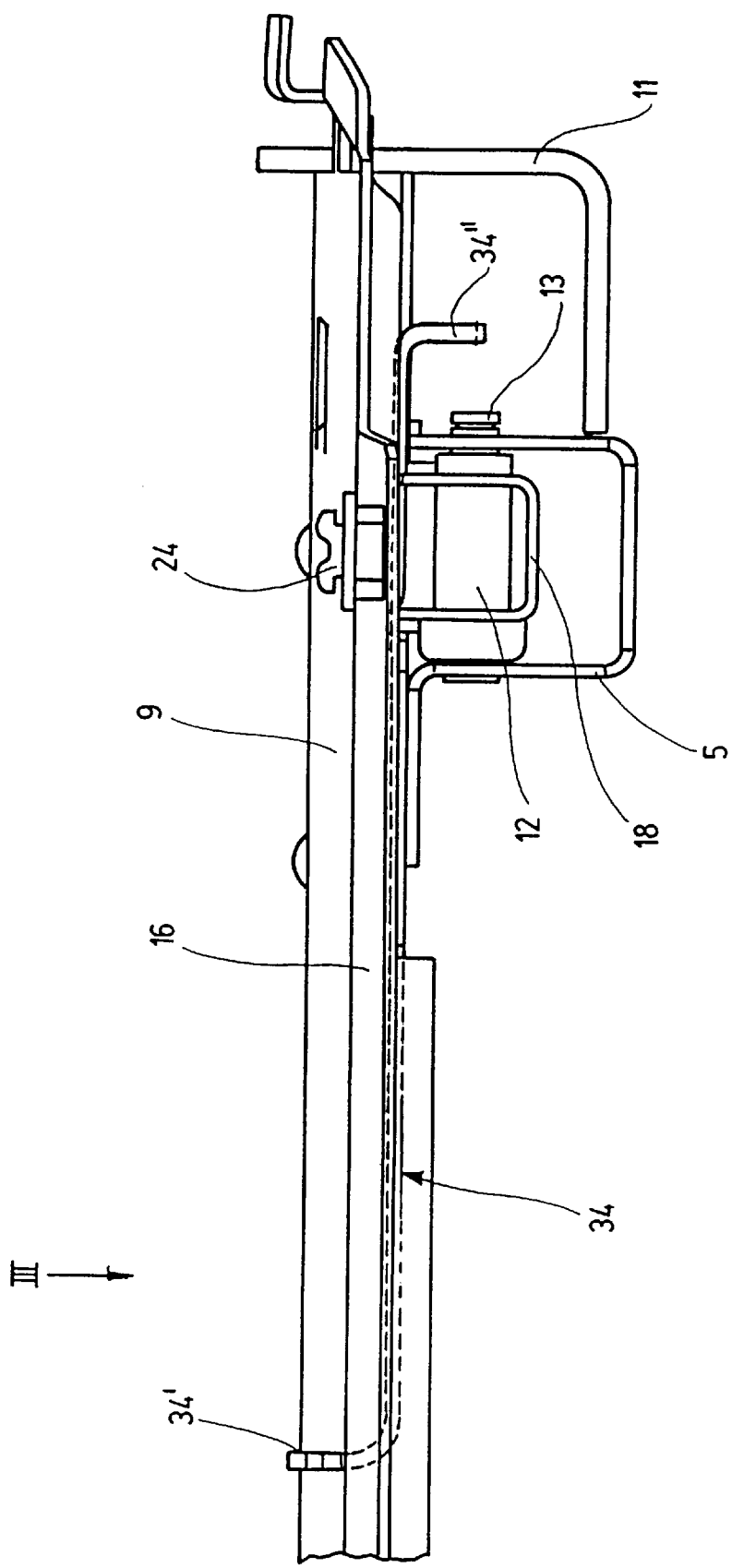
FIG. 4 shows a front view of the seat frame and carrier plate in the direction of the arrow IV in FIGS. 2 and 3.
Figure 5:
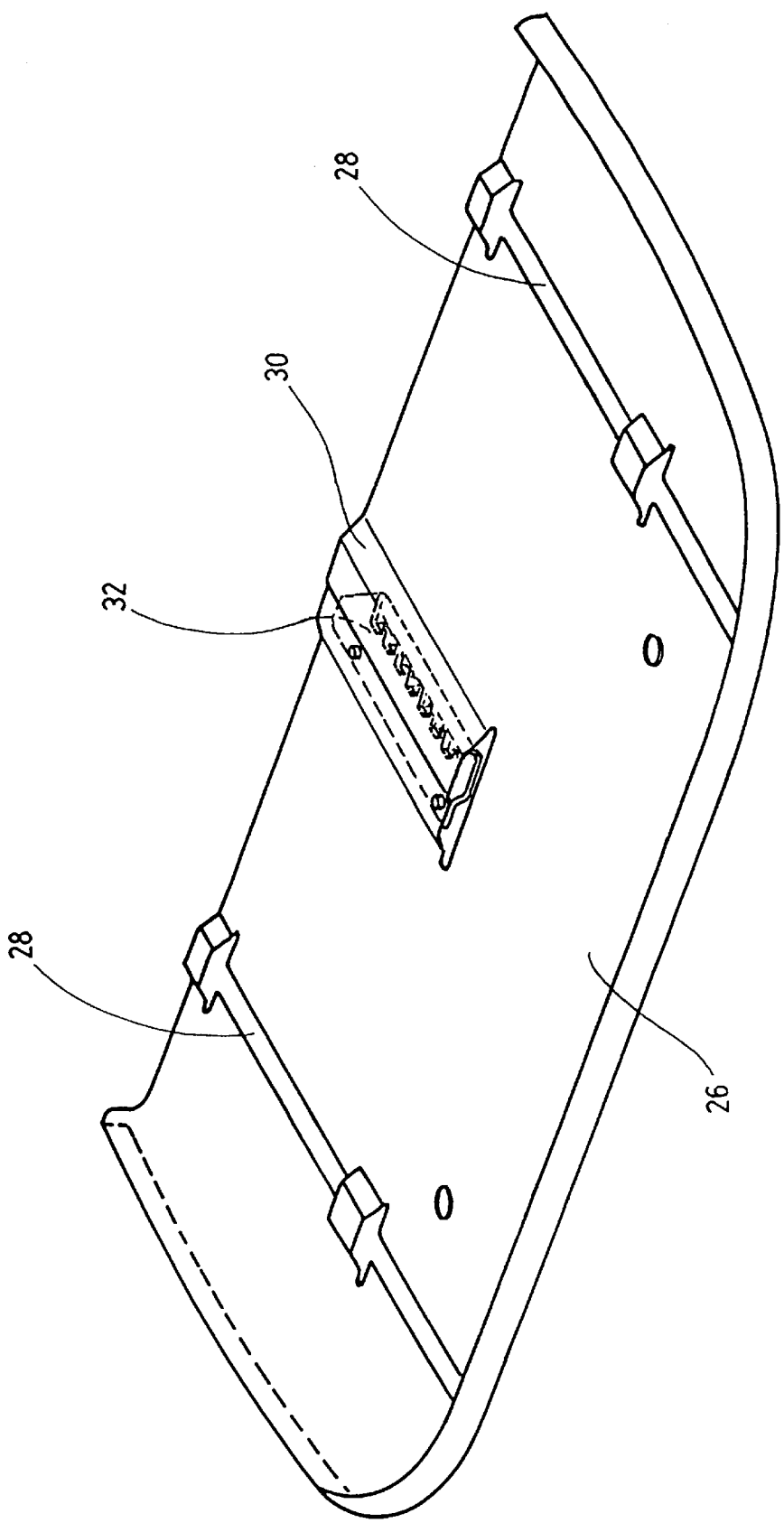
FIG. 5 shows a perspective view of a seat-shell front part.

In accordance with one exemplary embodiment, a vehicle seat 1 is fitted in a truck as a driver's seat. The following directional indications refer to the orientation specified by the normal direction of travel. The vehicle seat 1 is provided with a steel seat frame 3 which has: two parallel side parts 5, which are arranged in the longitudinal direction, have an essentially U-shaped profile, and are designed such that they are upwardly open; a planar connecting plate 7, which is arranged transversely to the side parts and connects the two side parts 5 in the front region on the upper side; an at least partially planar seat-shell rear part 9, which is arranged transversely to the two side parts 5 and connects the two side parts 5 in the rear region on the upper side; and two fastening plates 11 which are mounted laterally on the seat-shell rear part 9. The side parts 5 are connected on their lower side to the vehicle structure. The fastening plates 11 are provided with holes and welded-on nuts or with threaded holes in order to fasten a backrest structure to the seat frame 3.

On each limb of their U-shaped profile, the side parts 5 each have a hole 5' which is arranged, in the longitudinal direction, approximately in the center of the corresponding side part 5. The four holes 5' in total are all aligned transversely to the longitudinal direction and are flush with one another. A respective bearing bush 12 is inserted between the two holes 5' of each side part 5. A respective bearing bolt 13 is pushed through each bearing bush 12 and the relevant two holes 5' and is secured at its ends. The two bearing bushes 12 can be rotated relative to the two side parts 5 and the two bearing bolts 13.

An essentially planar carrier plate 16 has, on its lower side, two parallel U-profiles 18 running in the longitudinal direction. At its rear end, in the region of the rear edge of the carrier plate 16, one of the bearing bushes 12 is in each case inserted through each U-profile 18 and fastened. The carrier plate 16 can thereby be pivoted relative to the seat frame 3, the U-profile 18 at least partly fitting into the front half of the corresponding U-shaped profile of the side parts 5.

An inflatable cushion 21 is provided between the connecting plate 7 and the carrier plate 16, which cushion is connected via a connection to the compressed-air supply of the truck. By admission of compressed air, the cushion 21 can raise the carrier plate 16 and initiate a pivoting movement of the carrier plate 16, as a result of which the front edge of the carrier plate 16 is raised. Releasing compressed air out of the cushion 21 enables the carrier plate 16 to be lowered again. The releasing of the compressed air is assisted by the body weight of the seat user.

On its upper side, the carrier plate 16 has a respective slideway 24 above each U-profile 18. An essentially planar seat-shell front part 26, which is made of sheet metal and has a rounded front edge and raised border to the side and toward the front in order to attach the cover, has two parallel sliding fixtures 28 which are punched out of the material of the seat-shell front part 26. Each sliding fixture 28 holds a slideway 24. As a result, the seat-shell front part 26 can be displaced in the longitudinal direction relative to the carrier plate 16.

In order to secure a selected longitudinal adjustment of the seat-shell front part 26, the latter has, below an upwardly bent tooth covering 30, a toothed segment 32 whose teeth face toward the inside of the vehicle seat 1, i.e. toward the right seat side in the exemplary embodiment. The toothed segment 32 interacts with a movable locking bar 34. The locking bar 34 has a flat, elongated basic shape in the manner of a strip, the end sections 34' and 34" being bent upward or downward at right angles with respect to the basic shape.

The locking bar 34 is arranged and mounted movably on the lower side of the carrier plate 16 transversely to the longitudinal direction of the vehicle seat 1 between the center and the left seat side. The carrier plate 16 has two side guides 36 and a retaining guide 38, arranged between the side guides 36, the guides in each case being produced by pressing out of material, or else may be formed as a separate plastic part. The side guides 36 and the retaining guide 38 hold the locking bar 34 and are aligned in such a manner that the locking bar 34 is easily movable with little play. The side guides 36 are responsible for guiding in the plane parallel to the carrier plate 16 while the retaining guide 38 bears the weight of the locking bar 34 and keeps the latter bearing against the carrier plate 16, i.e. is responsible for guiding perpendicularly to the plane of the carrier plate 16.

The upwardly bent end section 34' of the locking bar 34 protrudes as far as the upper side of the carrier plate 16 through the side guide 36, which is situated further inward, or through an adjacent aperture 40 of the carrier plate 16, the aperture 40 being provided for installation of the locking bar 34. This end section 34' is provided with a latching opening or the like with which it can interact with one of the teeth of the toothed segment 32. The downwardly bent end section 34" of the locking bar 34 is arranged a sufficient distance on the left border of the carrier plate 16 that it comes to lie outside the side parts 5 irrespective of the pivoting position of the carrier plate 16.

By admission of compressed air to this end section 34", the locking bar 34 can be pressed away inward by a tooth of the toothed segment 32, so that the seat-shell front part 26 is unlocked and can be displaced with respect to the carrier plate 16 and can be adjusted in length. The locking bar 34 is pushed back outward by spring force, thereby locking the toothed segment 32 and therefore securing the seat-shell front part 26 on the carrier plate 16.

The front part of a seat cushion 42 is mounted on the seat-shell front part 26. A panel (not illustrated in the drawing) made of plastic is mounted along the border of the carrier plate 16. The rear part of the seat cushion 42 rests loosely on the seat-shell rear part 9. A backrest, which is only outlined in FIG. 1, is arranged above the rear end section of the seat cushion 42. The seat cushion 42 is sufficiently long that, even when the length of the seat surface is at its largest, there is still no vertical gap between the seat cushion 42 and backrest. The described pivoting of the carrier plate 16 by means of the cushion 21 enables the seat-surface inclination of the seat cushion 42, in particular the thigh support, to be pneumatically adjusted. The described displacement of the seat-shell front part 26 and the pneumatic unlocking and locking by means of the locking bar 34 enable the seat-surface length of the seat cushion 42 to be adjusted. The wiring and valve system necessary for the pneumatic adjustment is not illustrated in the drawing.

Figure 6:
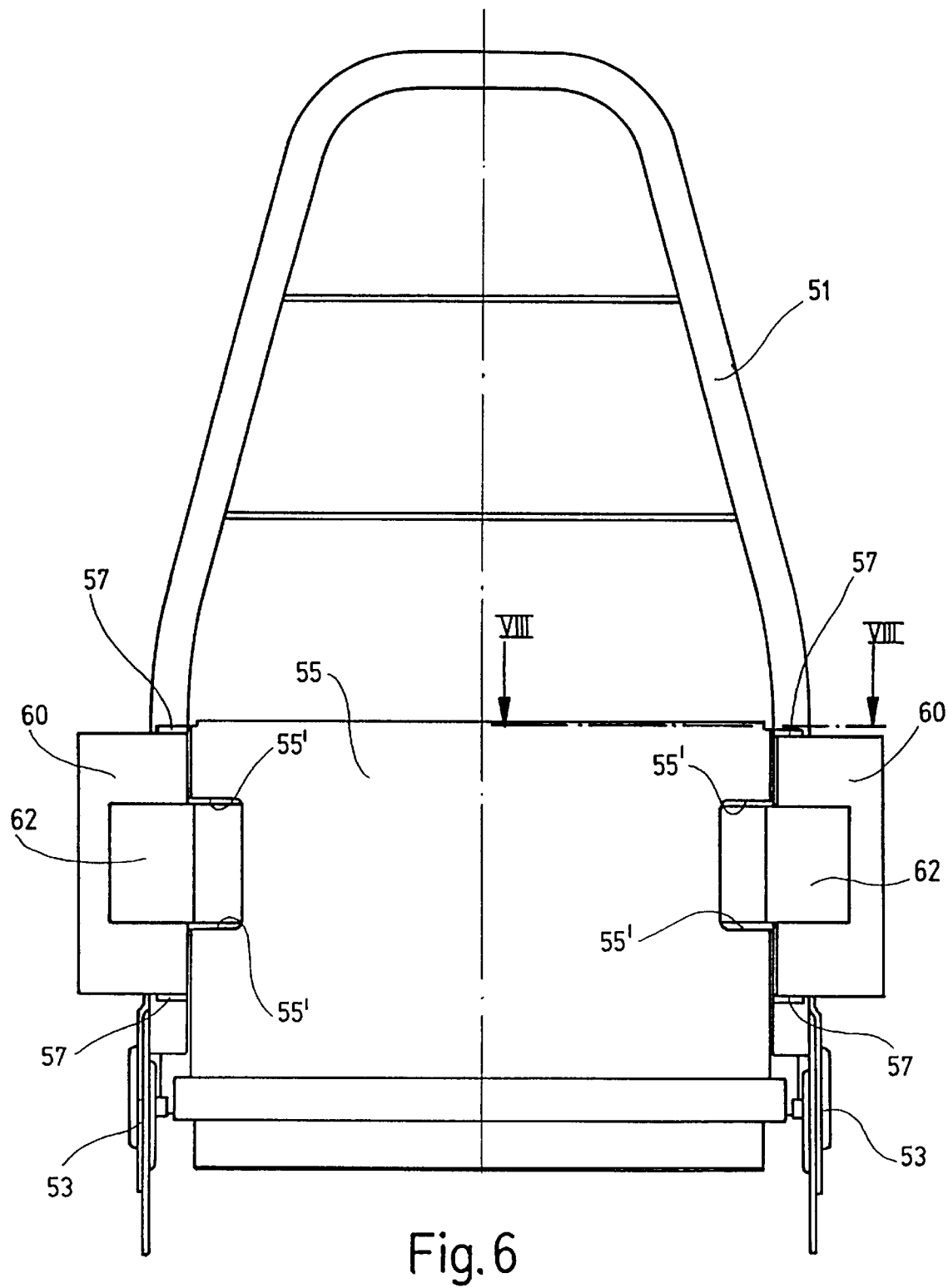
FIG. 6 shows a front view of a backrest structure.
Figure 7:
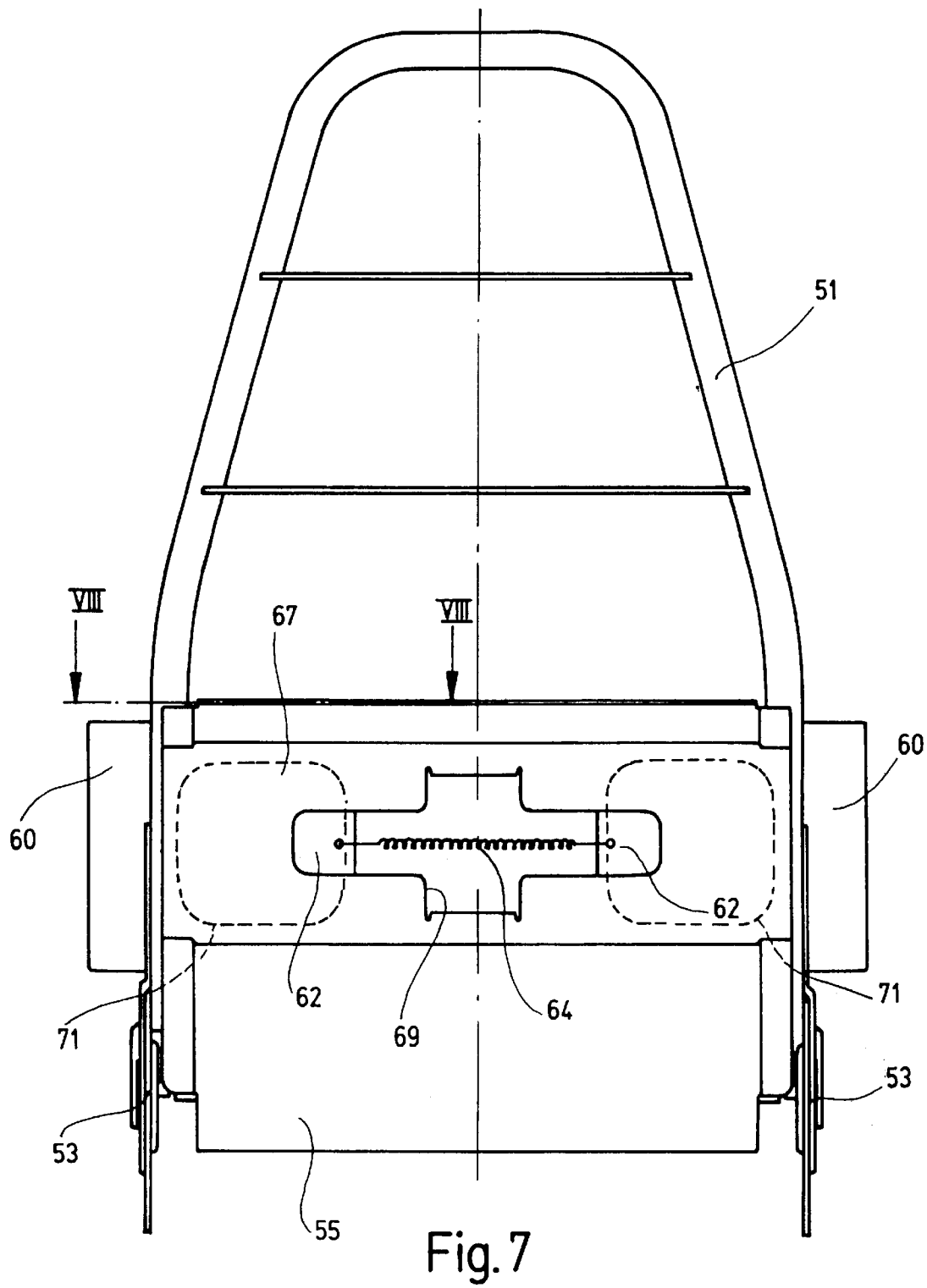
FIG. 7 shows a rear view of the backrest structure.
Figure 8:
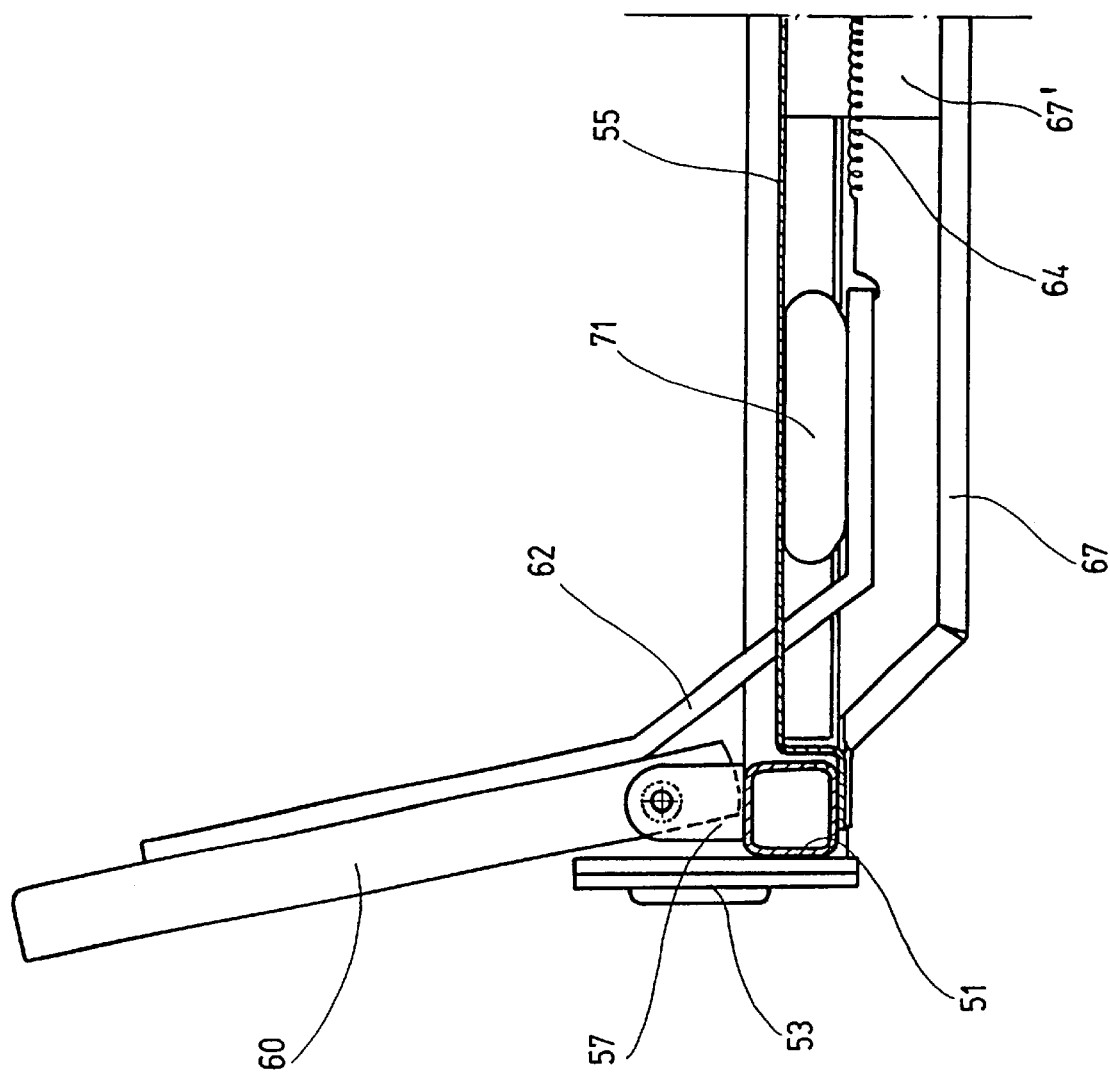
FIG. 8 shows a section through the left half of the backrest structure along the line VIII—VIII in FIGS. 6 and 7.

FIGS. 6 and 7 show the backrest structure before the padding is attached. The backrest structure is defined by a backrest frame 51 and the parts described in the following. The bow-shaped backrest frame 51 is bent from a square profile and fastened at the ends of its limbs to fittings 53, which are mounted in turn on the fastening plates 11. A lordosis support 55, which is designed approximately as a rectangular plate, is arranged in the lumbar region between the limbs of the backrest frame 51 and is attached to the backrest frame, i.e. is structurally fixed.

The backrest frame 51 is designed such that it is mirror-symmetrical on the left and right with regard to a vertical central plane, for which reason only the left side is described in more detail in the following. On each of the two limbs, the backrest frame has two holders 57 which protrude forward. Arranged between the two holders 57 is a side piece 60 which is mounted in the two holders 57 and can be pivoted about a rotational axis running parallel to the limb of the backrest frame 51.

An angular element 62 is mounted on the inside of the side piece 60, for example is welded on, but may also be formed integrally with the side piece 60. The angular element 62 is bent away from the side piece 60 about an edge running parallel to the rotational axis of the side piece, grips through a recess 55' of the lordosis support 55 and, on the rear side of the lordosis support 55, is bent away once more about an edge running parallel to the rotational axis of the side piece 60. In total, the angular element 62 approximately comprises an angle of 60°. On the inwardly situated end, the angular element 62 has a hook-in opening into which one end of a tension spring 64 is fitted. The other end of the tension spring 64 is fitted to the right angular element 62. The tension spring 64 causes the side pieces 60 to open.

A covering 67 is arranged behind the lordosis support 55 essentially parallel thereto. In the region of the left and of the right border, the covering 67 is angled obliquely forward and is fastened, for example welded on, to the backrest frame 51. The covering 67 has a cross-shaped opening 69 in its center. The material which is bent forward upward and downward in order to form the vertical arms of the cross-shaped opening 69 forms webs 67' with which the covering 67 is fastened to the lordosis support 55. The horizontal arms of the cross-shaped opening 69 leave the hook-in openings in the angular element 62 free for the tension spring 64.

A respective further cushion 71, which is enclosed by a flexible casing and can be inflated up to a certain size, is arranged as an air chamber between each angular element 62 and the rear side of the lordosis support 55. FIG. 7 illustrates the two cushions 71 with dashed lines, because the two cushions are hidden from view in FIG. 7. The two cushions 71 are connected to the compressed-air supply via a double valve (not illustrated). If the double valve simultaneously admits compressed air to the cushions 71, they increase in size, so that the angular elements 62 are pressed away from the lordosis support 55 counter to the force of the tension springs 64. As a result, the side pieces 60 pivot inward. The covering 67 limits the movement of the two angular elements 62. There is no connection between the two cushions 71, so that no air can flow from one cushion 71 into the other cushion 71.

If the compressed air is released out of the cushions 71, the cushions 71 are compressed by the force of the tension spring 64 and therefore bled of air, so that the angular elements 62 again move toward the lordosis support 55 and the side pieces 60 pivot outward as a result. The side pieces 60 can therefore be pneumatically adjusted with regard to their pivoting angle with respect to the backrest.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An adjustable vehicle seat, comprising:
    a structurally fixed part connected to a backrest frame;
    a first side piece having a first angular element that reaches as far as a rear side of the structurally fixed part;
    a first inflatable cushion positioned between the first angular element of the first side piece and the rear side of the structurally fixed part, and operative for pneumatically adjusting the position of the first side piece relative to the structurally fixed part, wherein the first side piece is mounted for pivoting relative to the backrest frame and the structurally fixed part in response to pneumatic operation of the first inflatable cushion;
    a second side piece positioned on a side of the adjustable vehicle seat opposite from the first side piece and having a second angular element that reaches as far as the rear side of the structurally fixed part; and
    a second inflatable cushion positioned between the second angular element of the second side piece and the rear side of the structurally fixed part, and operative for pneumatically adjusting the position of the second side piece relative to the structurally fixed part, wherein the second side piece is mounted for pivoting relative to the backrest frame and the structurally fixed part in response to pneumatic operation of the second inflatable cushion.

2. The adjustable vehicle seat as claimed in claim 1, further comprising a tension spring mounted for biasing toward one another portions of the angular elements that reach as far as the rear side of the structurally fixed part.

3. The adjustable vehicle seat as claimed in claim 1, further comprising a covering proximate sides of the angular elements which face away rearwardly from the rear side of the structurally fixed part.

4. The adjustable vehicle seat as claimed in claim 1, wherein the structurally fixed part comprises a lordosis support.

5. The adjustable vehicle seat as claimed in claim 1, further comprising a seat-shell rear part, an adjustable part, and a third inflatable cushion, wherein the adjustable part comprises a seat-shell front part, and wherein the third inflatable cushion is positioned and the seat-shell front part is mounted so that inclination of the seat-shell front part is adjusted relative to the seat-shell rear part in response to pneumatic operation of the third cushion.

6. The adjustable vehicle seat as claimed in claim 5, wherein the seat-shell front part is mounted for displacing relative to the seat-shell rear part to adjust the seat-surface length of the adjustable vehicle seat.

7. The adjustable vehicle seat as claimed in claim 6, wherein:
    the adjustable vehicle seat further comprises a seat frame;
    the adjustable part further comprises a carrier plate which is coupled to the seat frame; and
    the seat-shell front part is guided displaceably on the carrier plate for adjusting the seat-surface length of the vehicle seat.

8. The adjustable vehicle seat as claimed in claim 7, wherein the seat-shell front part comprises a toothed segment, and the adjustable vehicle seat further comprises a locking bar mounted on the carrier plate for moving relative to the seat-shell front part between:
    a locked configuration in which the locking bar interacts with the toothed segment to restrict movement of the seat-shell front part relative to the carrier plate, and
    an unlocked configuration in which the locking bar is disengaged from the toothed segment to allow movement of the seat-shell front part relative to the carrier plate.

9. The adjustable vehicle seat as claimed in claim 7, wherein the carrier plate is pivotably coupled to the seat frame.

10. The adjustable vehicle seat as claimed in claim 1, further comprising:
    a seat frame connected to the backrest frame;
    a seat-shell front part mounted for moving relative to the seat frame; and
    a third inflatable cushion positioned between the seat frame and the seat-shell front part, and operative for pneumatically adjusting the position of the seat-shell front part relative to the seat frame.

11. An adjustable vehicle seat, comprising:
    a structurally fixed part connected to a backrest frame;
    a first side piece;
    an inflatable cushion positioned between the first side piece and the structurally fixed part, and operative for pneumatically adjusting the position of the first side piece relative to the structurally fixed part, wherein the first side piece is mounted for pivoting relative to the backrest frame and the structurally fixed part in response to pneumatic operation of the inflatable cushion;

a second side piece positioned on a side of the adjustable vehicle seat opposite from the first side piece and mounted for pivoting relative to the backrest frame and the structurally fixed part; and a tension spring, wherein each of the side pieces comprises an angular element that reaches as far as a rear side of the structurally fixed part, and the tension spring is mounted for biasing toward one another portions of the angular elements that reach as far as the rear side of the structurally fixed part.

* * * * *